United States Patent
Dettner

[11] Patent Number: 6,101,386
[45] Date of Patent: Aug. 8, 2000

[54] METHOD AND COMMUNICATION NETWORK FOR THE TRANSMISSION OF INFORMATION BETWEEN NETWORK EQUIPMENT

[75] Inventor: Harald Dettner, Kirchhain, Germany

[73] Assignee: Siemens Aktiengesellschaft, Munich, Germany

[21] Appl. No.: 08/940,268

[22] Filed: Sep. 29, 1997

[30] Foreign Application Priority Data

Sep. 30, 1996 [DE] Germany .................. 196 40 310

[51] Int. Cl.⁷ .................................... H04Q 7/20
[52] U.S. Cl. ................. 455/433; 455/403; 455/422
[58] Field of Search ........................ 455/433, 426, 455/560, 403, 422, 561; 370/465, 467; 375/222

[56] References Cited

U.S. PATENT DOCUMENTS

| | | |
|---|---|---|
| 5,381,412 | 1/1995 | Otani . |
| 5,408,419 | 4/1995 | Wong .................................. 395/200.55 |
| 5,493,609 | 2/1996 | Winseck, Jr. et al. . |
| 5,794,142 | 8/1998 | Vanttila et al. .......................... 455/419 |
| 5,850,391 | 12/1998 | Essigmann ............................... 370/331 |
| 5,862,480 | 1/1999 | Wild et al. .............................. 455/432 |
| 5,878,348 | 3/1999 | Foti ........................................ 455/434 |

FOREIGN PATENT DOCUMENTS

0833540A2  9/1997  Germany ................. H04Q 7/38

OTHER PUBLICATIONS

ETSI—European Telecommunication Standard, Europan digital cellular telecommunications system (Phase 2); Mobile Application Part (MAP) specification (GSM 09.02).

*Primary Examiner*—William G. Trost
*Assistant Examiner*—Sonny Trinh
*Attorney, Agent, or Firm*—Hill & Simpson

[57] ABSTRACT

The present invention is directed to a trial and error method, wherein a network equipment initiates a dialogue with another network equipment with a message as usual and thus communicates the function(s) it supports. When the other network equipment acknowledges the set up dialogue with a positive message or with a negative message with respect to the support of the function(s), a corresponding entry is formed in a table. This means that each network equipment actively builds the table itself by initiating dialogues and can update it according to the response, without respectively requiring a separate message therefor for the exchange of supported performance features and/or of properties of the network equipment. The network equipment thus notes in its table which dialogues another network equipment proceeded positively and which did not take place.

8 Claims, 2 Drawing Sheets

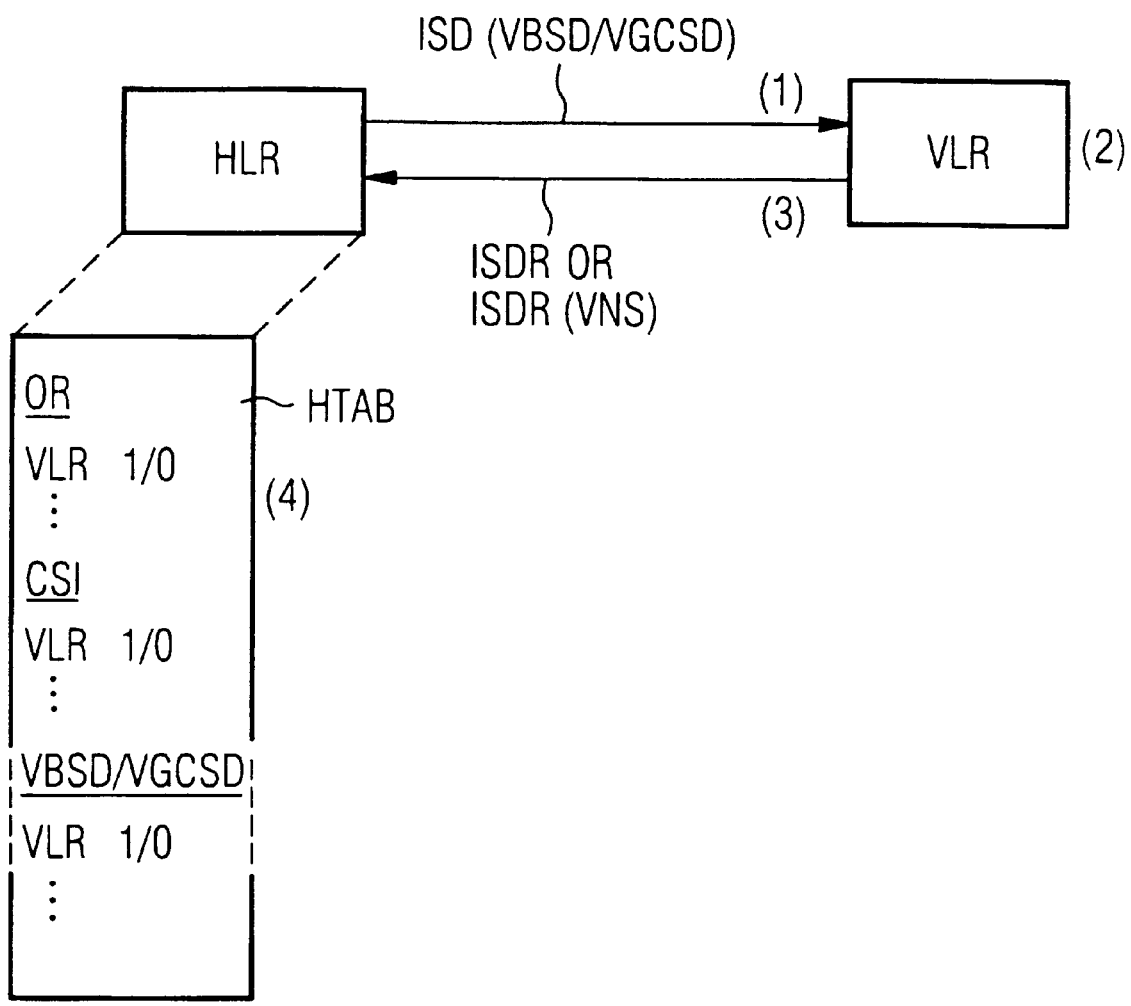

METHOD AND COMMUNICATION NETWORK FOR THE TRANSMISSION OF INFORMATION BETWEEN NETWORK EQUIPMENT

BACKGROUND OF THE INVENTION

1. Field of the Invention

The present invention is directed generally to the field of telecommunication systems, and more particularly, the present invention is directed to a method for transmitting information between network equipment of one or more communication networks and a corresponding communication network.

2. Description of the Related Art

It is known to sequence transactions that relate to the transmission of information according to standardized signalling protocols between network equipment of one or more communication networks. For example, a central signalling system No. 7 (CCS7) employs a signalling protocol and is divided into a plurality of constituent parts in the international cellular mobile radiotelephone network according to the GSM standard (Global System for Mobile Communication). This is supported in the individual countries by respective mobile radiotelephone networks with corresponding network operators. The central signalling system comprises application parts in addition to a user part for telephony at the interface to an ISDN network or a public telephone network. Thus, the mobile application part controls the internal communication between the network equipment of the mobile radiotelephone network or networks. The application part makes one or more signalling procedures available which assume closed control functions.

GSM Specification 09.02, Final Draft, November 1994, pages 38 through 40, discloses a method for declaring the application version that is based on a trial and error method wherein the most supported application version for the network equipment affected by the dialogue and a particular date that indicates the point in time of the support of a higher application version by the respective network equipment are entered in a first table. As soon as the date particular is reached, the currently supported application version is identified as unknown and a branch is made to a second table. The known method assumes that the point in time for the transition to the higher application version supported by the network equipment is known. The entries in the first table are set once by a control function and subsequently remain in a static condition.

In order to set up a dialogue between two network equipment of the mobile radiotelephone networks according to an earlier patent application of the applicant (Serial Number 196 04 049.3-31), a separate message (ENCI, Exchange of Network Capabilities Information) is transmitted during the course of the mutual transmission of information about supported performance features and/or properties of the network equipment. This message serves the purpose of asking whether the function supported by one network equipment are also available in the collaborating network equipment for following dialogues. When this is the case, an entry is made in a table. The entries ensure that information transmission is executed only when the collaborating network equipment supports the function(s). In addition to the necessity of a separate message (ENCI), this method has the disadvantage that, after confirmation of the support of a function by the collaborating network equipment, errors can occur in the network equipment that lead to a disconnect of sub-functions or of the entire function but a correction of the table in the interrogating network equipment is not provided. A signalling with the separate message (ENCI) is no longer possible when an error occurs. Error handling is not provided in the separate message (ENCI).

An object of the present invention is to specify a method with which network equipment can be informed about the functions available in other network equipment in the most simple way while taking into consideration potentially occurring errors.

SUMMARY OF THE INVENTION

The present invention is based on a trial and error method wherein a network equipment initiates a dialogue with another network equipment with a message as usual and thus communicates the function or functions it supports. When the other network equipment acknowledges the set up dialogue with a positive message or with a negative message with respect to the support of the function or functions, a corresponding entry is formed in a table. Each network equipment actively builds such a table itself by initiating dialogues and can update the table according to the response, without requiring a separate message for the exchange of supported performance features and/or of properties of the network equipment. The network equipment thus notes in its table which dialogues with another network equipment proceeded positively and which gave a negative result. Errors can also be reliably recognized and taken into consideration in the table in this simple way, so that unnecessary information transmissions because of unsupported functions are avoided in advance.

For following dialogues, it is advantageous that when the network equipment which would respectively like to initiate a dialogue initially interrogates the table for the presence of an entry for the other network equipment and commences the dialogue only when a positive entry exists. Alternatively, it is advantageous for subsequent dialogues that when the network equipment encounters a negative entry when it initiates the dialogue, it first interrogates the table for the presence of an entry for the other network equipment. The dialogue is either not commenced or is started with substitute information in the message to be transmitted.

It is particularly advantageous that a check of the supported functions by the network equipment is initiated at regular intervals and the entries in the table are updated depending on the test result.

According to one particularly advantageous aspect of the present invention, the functions relate to new and/or existing telecommunication services, auxiliary services and/or performance features that are to be made available in the communication network. In particular, the procedures for the implementation of the telecommunication services, auxiliary services and/or performance features are to be declared as available functions between the network equipment.

The invention is explained in greater detail on the basis of exemplary embodiments shown in Figures. These respectively relate to the information transmission between a home register and a visitor register of a mobile radiotelephone network.

BRIEF DESCRIPTION OF THE DRAWINGS

FIG. 3 illustrates the information transmission for a service relating to group calls.

DETAILED DESCRIPTION OF THE PREFERRED EMBODIMENTS

In the present example, information is transmitted between two network equipments of a digital cellular international mobile radiotelephone network of the GSM Standard according to a mobile radiotelephone-specific application part (MAP) of the known central signalling system CCS7. The network equipment are each formed by a home register HLR and a visitor register VLR. They are merely representative of all types of network equipment of the mobile radiotelephone network. The network equipment can also be located in different national networks with different network operators. The invention is not limited to mobile radiotelephone networks but can also be applied to network equipment of other communication networks, such as, for example, line-bound fixed networks.

The visitor register VLR represents a decentralized subscriber database in which the subscriber data of the mobile radiotelephone subscribers currently residing in a specific coverage area are temporarily stored for the duration of the visit. The visitor register VLR is allocated to a mobile exchange that assumes switching functions for call handling of incoming and outgoing calls for a coverage area of the mobile radiotelephone network. The home register HLR serves as central subscriber database and permanently stores the subscriber data of the mobile radiotelephone subscribers registered in the mobile radiotelephone network. A plurality of home registers HLR and visitor registers VLR are usually distributed over the entire coverage area of the mobile radiotelephone network.

Figure 1:
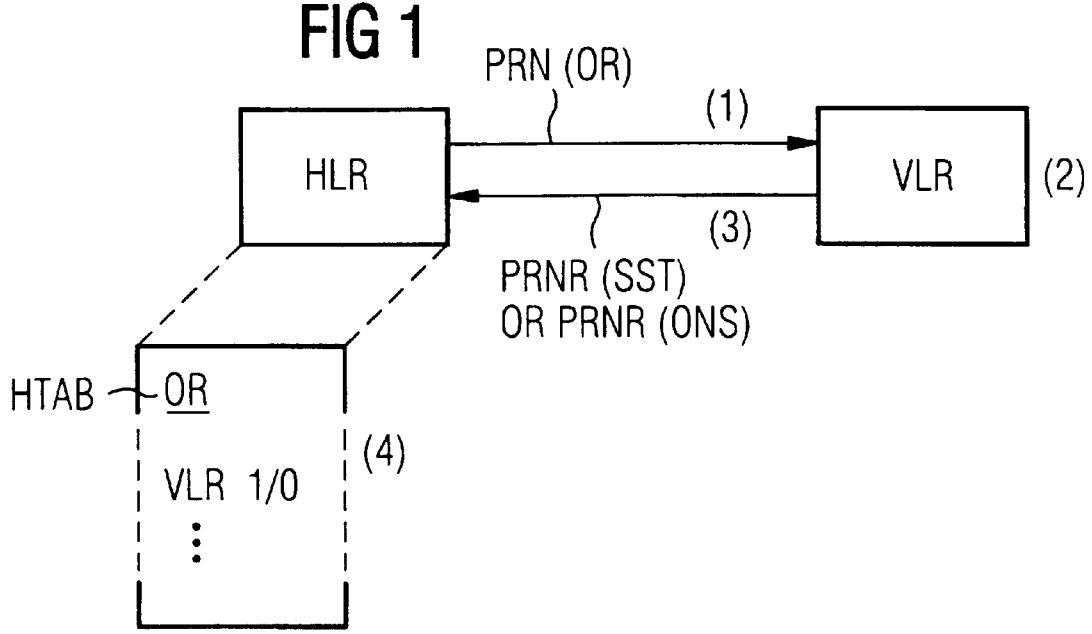
FIG. 1 illustrates the information transmission for optimized routing of connections.

FIG. 1 illustrates the information transmission for supporting an optimal routing of connections in the GSM mobile radiotelephone network. According to GSM Recommendation 03.79, Version 0.9.0 of Jul. 31, 1996, an access mobile exchange of a first network sends a message—in internetwork fashion—for a visited area inquiry to the home register of the home network in which a called mobile radiotelephone subscriber is permanently registered with his subscriber data. The purpose of the visited area inquiry is comprised in an offering of information with reference whereto the access mobile exchange can set up a direct connection to a visitor mobile exchange of a visitor network in which the called mobile radiotelephone subscriber resides at the moment.

According to GSM Recommendation 03.79, at least one visited area inquiry is implemented during the course of the optimal routing whereby information about the location of the called mobile radiotelephone subscriber, for example, in the form of the address of the corresponding visitor mobile exchange, are first called by the access mobile exchange with an inquiry (send location info) directed to the home register. Subsequently, the home register HLR commences a dialogue with the visitor register VLR currently responsible for the mobile radiotelephone subscriber in that a message PRN (provide roaming number) is sent. The message PRN contains an information OR with which the visitor register VLR is informed (1) of the function(s) supported by the home register HLR. This is directed to optimal routing in the present example. The visitor register VLR subsequently checks whether the optimal routing is likewise supported (2) and returns a check result to the home register HLR in a message PRNR (provide roaming number result).

A positive check result can be recognized on the basis of the reception of one or more information SST that signal the subscriber status of the called mobile radiotelephone subscriber. The subscriber status indicates, for example, whether the mobile radiotelephone subscriber can be reached via his radiotelephone subscriber station and is not in a deactivated condition or in a condition that is disconnected from the radio coverage. It is also possible that a temporary location telephone number (Mobile Subscriber Roaming Number) is already co-transmitted in the message PRNR, this being temporarily needed for the call setup. A negative check result can be recognized on the basis of the reception of an information ONS (optimal routing not supported) with which the visitor register VLR signals (3) the non-support of optimal routing. The home register HLR autonomously builds a table HTAB in which, as a result of the individual dialogues with other network equipment such as, for example, the visitor register VLR, entries are stored for identifying the support or the non-support of functions. For the case of a negative result, the home register HLR enters (4) a binary 0 for identifying non-support of the functions by the visitor register VLR in the table HTAB and, as positive entry for identifying the support of the functions by the visitor register VLR, enters a binary 1 in the table HTAB. The information entered in the table HTAB is used for future dialogues such that when there is no support of the optimal routing in order to avoid unnecessarily the exchange of signalling messages. New dialogues for information transmission are regularly started in order to consider changes with respect to the functionality and to bring the entries in the table HTAB to the most current status and dynamically revise them.

Figure 2:
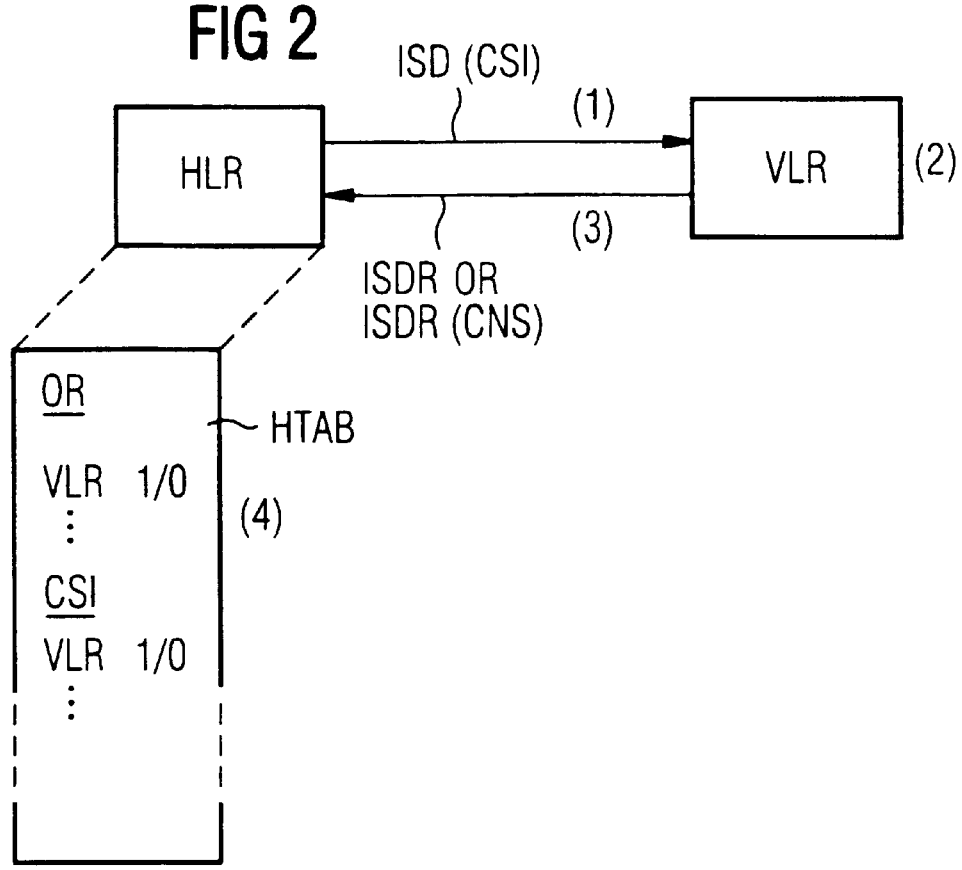
FIG. 2 illustrates the information transmission for a performance feature for supporting a network operator-specific service.

Another example according to FIG. 2 shows the information flow for a performance feature supporting a network operator-specific service that is known from "The CAMEL feature, proposed revisions to the stage 1 description" of ETSI/STC/SMG1, Mar. 14, 1995, GSM Recommendation 02.78, Version 0.4.0, pages 1–9. When updating the location registration (location update), a new visitor register VLR sends an updating message indicating its identity and that of the mobile radiotelephone subscriber to the home register HLR. In response thereto, the home register HLR sends a message ISD (insert subscriber data) to the visitor register VLR in which information CSI (CAMEL subscription information), for example the data of the performance feature its supports, are contained (1). The visitor register VLR checks whether it also supports the performance feature (2) and acknowledges (3) the established dialogue with the return of the message ISDR (insert subscriber data result). For non-support, an information CNS (CAMEL not supported) is contained in the message ISDR as a result of a negative result. The table HTAB receives a further entry for the information CSI in that either the binary 0 (for a negatively resulting dialogue) or a binary 1 (for a positive result) is entered (4) for the visitor register VLR.

Another example according to FIG. 3 shows the information flow for services relating to group calls that, for example, are known from the GSM Recommendations 03.68 and 03.69, Versions 4.0.0, of January, 1995. With the described group call services (VGCS, Voice Group Call Service and VBS, Voice Broadcast Service), a group call is directed to a group of radiotelephone subscribers for whom the corresponding service is provided. The subscribers of the group are thereby located in a group call service area—usually composed of a plurality of radio cells—that is services by a mobile switching center of the mobile radiotelephone network. Each group call can be recognized on the basis of a specific subscriber call number that comprises at least a service area identity for identifying the group call service area and a group information (group identity) for identifying the group of subscribers affected by the group call. When updating the location registration (location update), as already described above, a new visitor register VLR sends an updating message indicating its identity and that of the mobile radiotelephone subscriber to the home register HLR.

In the present example, the home register HLR likewise sends the message ISD (insert subscriber data) to the visitor register VLR in which, by contrast to FIG. 2, other information VBSD or, respectively, VGCSD, for example the data of the group call service it supports, are contained (1). The visitor register VLR checks whether it also supports the respective group call service (2) and acknowledges the established dialogue by returning (3) the message ISDR (insert subscriber data result). Where there is non-support, an information VNS (VBSNGCS not supported) is contained in the message ISDR as a result of the negative result. The table HTAB receives a further entry for the information VBSD or, respectively, VBS in that either the binary 0 (given negatively resulting dialogue) or the binary 1 (for positively resulting dialogue) is entered (4) for the visitor register VLR.

What all examples have in common in every dialogue with a different network equipment is that the table of the inquiring network equipment is interrogated first as to whether an entry for this other network equipment is already present in the table, and the dialogue is continued only with a positive entry. Otherwise, for example, a substitute service that is supported by the cooperating network equipment based on knowledge of the table is implemented. In the described examples, the visitor register VLR reflects at least non-supported functions that relate to services (optimal routing), auxiliary services (group call services) and/or performance features (CAMEL) back to the home register HLR. When the visitor register VLR does not receive a negative response and when the dialogue, thus, has proceeded successfully, the home register—even without separate information—assumes that a support of the respective functions by the visitor register VLR is established. Alternatively thereto, the transmission of an information for signalling the support of the functions is also possible.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim as my invention:

1. A method for transmitting information between network equipment of a plurality of communication networks, comprising the steps of:

commencing a dialog from a first network equipment to a second network equipment, including:
transmitting a message from the first network equipment to the second network equipment,
acknowledging said message by the second network equipment returning a reply message;
communicating functions supported by the first network equipment to the second network equipment in the message,
checking for support by the second network equipment of the functions, said checking step identifying functions as supported or non-supported,
communicating a result of the checking step to the first network equipment in the reply message, and
building a table by the first network equipment including forming an entry for the second network equipment, said entry being a positive entry for functions supported by the second network equipment and a negative entry for non-supported functions by the second network equipment as needed.

2. A method according to claim 1, further comprising a step of:
interrogating the table for presence of an entry for the second network equipment, and
initiating a further dialogue if said interrogating step finds a positive entry for said second network equipment.

3. A method according to claim 1, further comprising a step of:
interrogating the table for presence of an entry for the second network equipment, and
ceasing the dialogue if said interrogating step finds a negative entry for said second network equipment.

4. A method according to claim 1, further comprising a step of:
initiating at regular intervals a check of supported functions of other network equipment, and
updating the entries in the table corresponding to the other network equipment depending on the result of said checks.

5. A method according to claim 1 wherein:
the functions in the table relate to new and/or existing telecommunication services, auxiliary services and/or performance features available in the communication network.

6. A method according to claim 5, wherein the functions relate to procedures for implementation of telecommunication services, auxiliary services and/or performance features available in the communication network.

7. A method according to claim 1, wherein the network equipment belongs to an international mobile radiotelephone network and are located in different national networks.

8. A communication network for transmitting information between a plurality of network equipment, comprising:
a first network equipment having a means for commencing a dialogue by transmitting a message to a second network equipment and
the second network equipment comprises a means for acknowledging the dialogue by returning a reply message;
wherein the transmitted message identifies functions supported by the first network equipment that can be checked for support by the second network equipment and a result is contained in the reply message; and
a table in the first network equipment, which is built in response to said transmitted message in which a positive entry for identifying the support of the functions by the second network equipment is stored in the case of a positive result or a negative entry for identifying the non-support of the functions by the second network equipment is stored in case of a negative check result.

* * * * *